United States Patent [19]

Gellert et al.

[11] Patent Number: 5,002,480
[45] Date of Patent: Mar. 26, 1991

[54] INJECTION MOLDING INSULATED VALVE MEMBER

[75] Inventors: Jobst U. Gellert, Georgetown; Denis Babin, Welland, both of Canada

[73] Assignee: Mold-Masters Limited, Georgetown, Canada

[21] Appl. No.: 430,325

[22] Filed: Nov. 2, 1989

[51] Int. Cl.$^5$ .............................................. B29C 45/23
[52] U.S. Cl. ...................................... 425/549; 29/611; 137/340; 137/375; 264/328.15; 425/563; 425/564; 425/566
[58] Field of Search ............... 425/547, 548, 549, 562, 425/563, 564, 566, 568; 264/328.15, 328.8; 29/611; 137/340, 375

[56] References Cited

U.S. PATENT DOCUMENTS 4,712,994 12/1987 Fiekens et al. .................. 425/564
4,917,593 4/1990 Gellert .............................. 425/549
4,917,594 4/1990 Gellert et al. .................... 425/549
4,938,681 7/1990 Gellert .............................. 425/563

FOREIGN PATENT DOCUMENTS 2109296 6/1983 United Kingdom ............... 425/549

Primary Examiner—Timothy Heitbrink
Attorney, Agent, or Firm—Riches, McKenzie & Herbert

[57] ABSTRACT

An injection molding steel valve member in which a central cooling shaft is surrounded by a series of concentric insulation chambers. Cooling water is pumped through the cooling chamber to remove heat from the forward end of the valve member so the adjacent melt in the cavity will solidify more quickly. The insulation chambers reduce lateral heat loss to minimize the problem of solidification of melt around the outer cylindrical surface of the valve member.

4 Claims, 2 Drawing Sheets

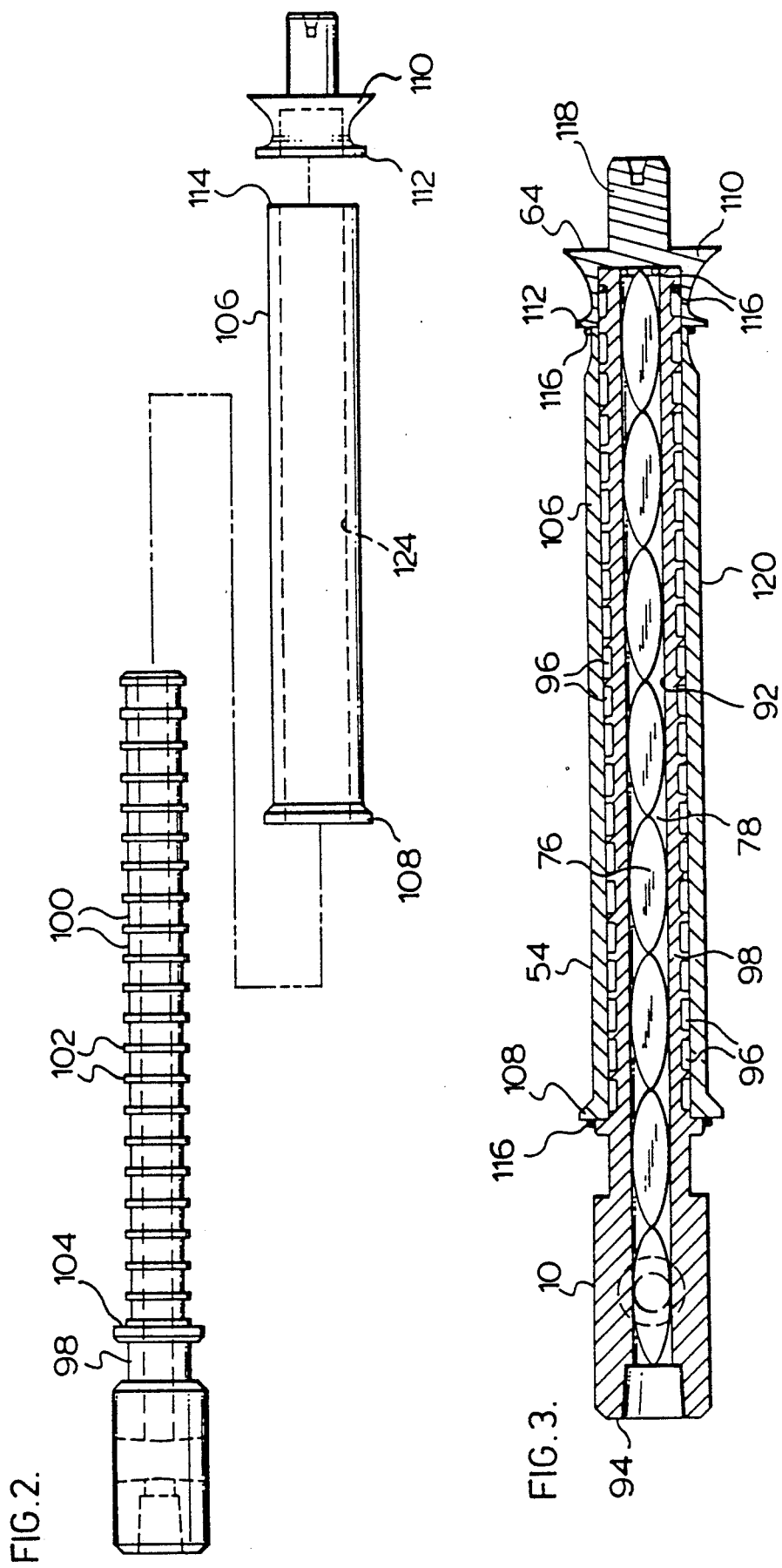

1

INJECTION MOLDING INSULATED VALVE MEMBER

BACKGROUND OF THE INVENTION

This invention relates to injection molding and more particularly to an improved valve member for use in a valve gated injection molding system.

In a valve gated injection molding system the melt normally flows around the valve member which reciprocates in a melt bore extending centrally in a heated nozzle. As shown in U.S. Pat. No. 4,938,681 to Gellert which issued July 3, 1990 entitled "Injection Molding System Having Offset Valve Pin Biasing Mechanisms", for some applications it is desirable to provide additional cooling to the forward end of the valve member by running cooling water through a central hole in the valve member. This is particularly true for valve members having an enlarged forward end which extends into the cavity and is biased to close in the retracted position. However, it has been found that for some materials such as styrene and ABS, the cooling of the valve member produces too much solidification of the melt flowing around it during long cycles which results in unsatisfactory products being molded and delays colour changes.

SUMMARY OF THE INVENTION

Accordingly, it is an object of the invention to at least partially overcome the problems of the prior art by providing an injection molding valve member which is insulated to reduce the cooling effect of the cooling water circulating in the central cooling hold on the outer cylindrical surface.

To this end, in one of its aspects, the invention provides an injection molding valve member having an elongated portion with a generally cylindrical outer surface and a generally cylindrical inner surface, the inner surface forming a cylindrical central cooling shaft which extends longitudinally through the elongated portion of the valve member having the improvement wherein the elongated portion of the valve member has at least one insulation chamber which extends concentrically around the central cooling shaft along a substantial portion of the length of the cooling shaft, the insulation chamber being spaced between the outer and inner cylindrical surfaces of the valve member.

Further objects and advantages of the invention will appear from the following description, taken together with the accompanying drawings.

BRIEF DESCRIPTION OF THE DRAWINGS

FIG. 2 is an exploded view showing the components of the valve member seen in FIG. 1, and FIG. 3 is a sectional view showing the components seen in FIG. 2 integrally joined together.

DETAILED DESCRIPTION OF THE DRAWINGS

Figure 1:
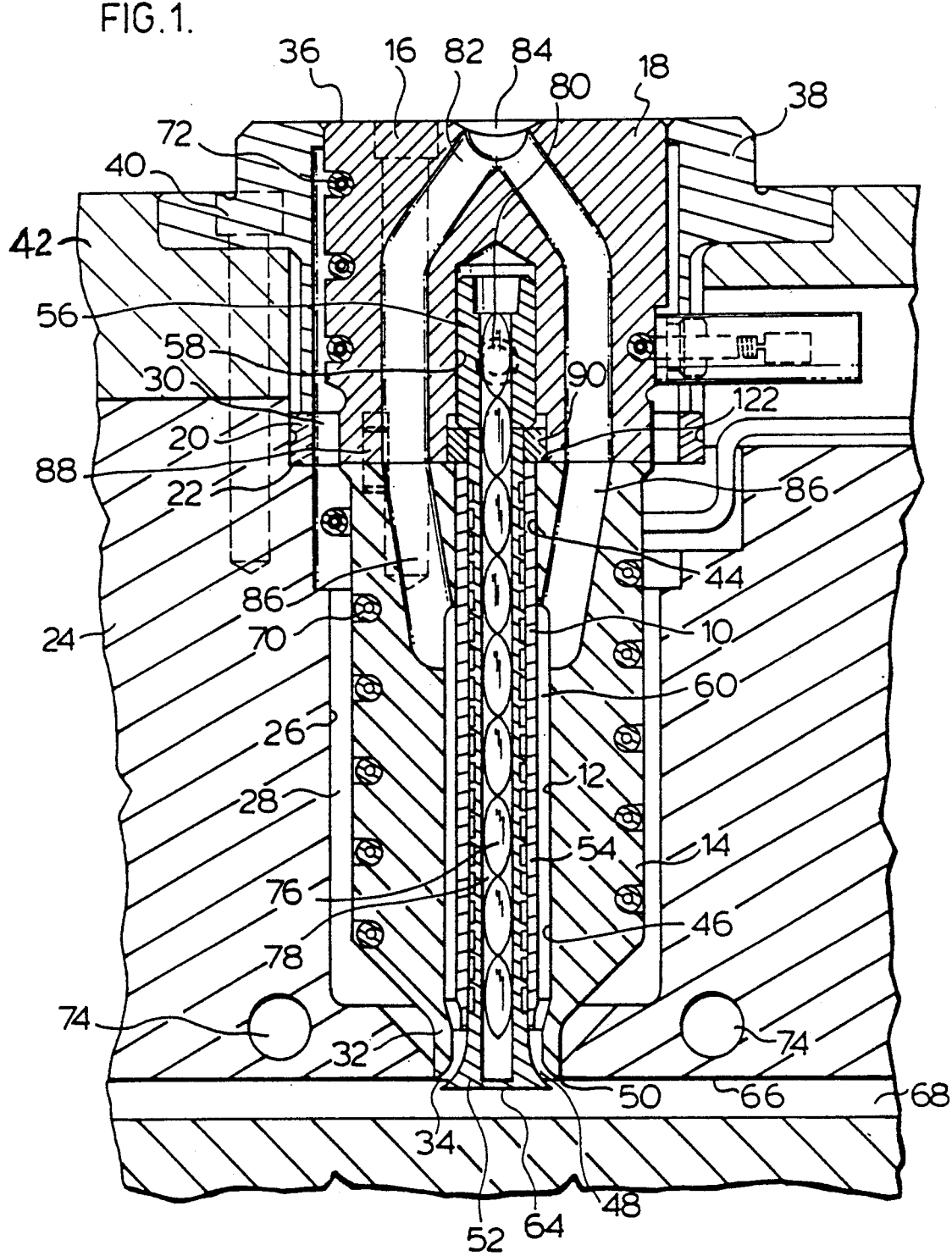
FIG. 1 is a sectional view of a portion of an injection molding system showing a valve member according to a preferred embodiment of the invention.

Reference is first made to FIG. 1 which shows a valve member 10 according to one embodiment of the invention received in a central bore 12 in a nozzle 14 which is secured by bolts 16 to a manifold 18. The manifold 18 has a locating flange 20 which is seated against a circumferential shoulder 22 of a cavity plate 24 to locate the nozzle 14 in a well 26 in the cavity plate 24 with an insulative air space 28 between the heated nozzle 14 and the cooled cavity plate 24. The locating flange 20 has openings 30 through it to reduce heat loss to the surrounding cavity plate 24. The nozzle 14 and manifold 18 are also located laterally by a forward nose portion 32 of the nozzle 14 being received in a matching cylindrical opening 34 through the cavity plate 24 and by the rear end 36 of the manifold 18 being received in a matching opening in a locating collar 38. The locating collar 38 is held securely in place by bolts 40 which extend through the back plate 42 into the cavity plate 24.

The central bore 12 through the nozzle 14 has a rear portion 44 and a larger diameter forward portion 46 which extends through the nose portion 32 of the nozzle to form a gate 48 with a forward mouth 50. The valve member 10 has an enlarged forward end 52, an elongated central portion 54 which extends through the central bore 12, and a rear portion 56 which extends into a central opening 58 in the manifold 18. The central portion 54 of the valve member 10 is considerably smaller in diameter than the forward portion 46 of the central nozzle bore 12 through which it passes, thus providing a melt flow space 60 between them. The enlarged forward end 52 of the valve member seats in the mouth 50 of the gate 48 in the retracted closed position and has a flat forward face 64 which aligns with the adjacent side 66 of the cavity 68 in the closed position The central portion 54 of the valve member 10 fits in the rear portion 44 of the central nozzle bore 12 through the nozzle 14 to prevent leakage of pressurized melt around the reciprocating valve member 10.

In this embodiment, the nozzle 14 is heated by an integral electric heating element 70. The manifold 18 is heated by an electrical heating element 72 which is similarly integrally brazed into it. The cavity plate 24 is cooled by pumping cooling water through cooling conduits 74 In this large volume application with the forward face 64 of the valve member extending to the cavity 68, it is desirable to provide more cooling to the enlarged forward end 52 of the valve member 10. Thus, a twisted dividing baffle 76 is mounted in a cylindrical central cooling shaft 78, the hollow valve member 10, and a circulation of cooling water is provided between inlet and outlet pipes which extend laterally from the rear portion 56 of the valve member 10 through lateral openings in the manifold 18. Thus, cooling water flows into the valve member 10 through the inlet pipe 80, forward through the cooling shaft 78 along one side of the spiral baffle 76 to the enlarged forward end 52 where it crosses over and flows rearwardly along the other side of the baffle 76 and back out through an outlet pipe (not shown).

As seen in FIG. 1, a melt passage 82 extends to convey pressurized melt from a central inlet 84 at the rear end 36 of the manifold 18 to the gate 48. The passage 82 splits into two branches 86 which extend around the opening 58 in the manifold and join the space 60 around the central portion 54 of the valve member 10. A locating pin 88 extends between the nozzle 14 and the manifold 18 to ensure the branches 86 of the melt passage 82 are in proper alignment when the system is assembled. The forward portion 46 of the central nozzle bore 12 must be sufficiently larger than the central portion 54 of the valve member 10 to provide the space 60 with a sufficient cross-sectional area to convey the melt received through the split branches 86 of the melt passage 82. When the injection pressure of the melt forces the valve member 10 to the forward open position, the melt then flows through the gate 48 outwardly around the enlarged forward end 52 of the valve member 10 into the cavity 68.

As fully described and shown in U.S. Pat. No. 4,938,681 referred to above, a biasing mechanism having a coiled compression spring (not shown) is provided to apply a continual force through a split ring 90 to bias the valve member towards the retracted closed position.

Referring specifically to FIGS. 2 and 3, the structure and method of making the valve member 10 according to this embodiment of the invention will now be described in detail. As described above, the valve member 10 has an elongated cooling shaft 78 formed by a cylindrical inner surface 92 which extends from the rear end 94 and receives the spiral baffle 76 which is mounted therein. The central portion 54 of the valve member 10 has a number of circular insulation chambers 96 which extend around the cooling shaft 78. The insulation chambers 96 are longitudinally spaced in alignment around the central cooling shaft 78. While the insulation chambers 96 have a uniform rectangular cross-section and are evenly spaced in this embodiment, other configurations can be provided to vary the insulation effect along the length of the central portion 54 of the valve member.

The valve member 10 is made by machining a hollow steel inner portion 98 with a series of circumferential grooves 100 extending between the ridges 102 from a circumferential flange 104. After the spiral baffle 76 is mounted in place, the inner portion 98 is inserted into a hollow steel sleeve 106 having a flanged end 108 which abuts against the flange 104 of the inner portion 98. Beads of nickel brazing paste 116 are applied around the end 114 of the sleeve 106 and a steel end portion 110 having a flanged lip 112 is then mounted against the it. Additional beads of nickel brazing paste 116 are then applied around the flanged end 108 of the sleeve 106 and the flanged lip 112 of the end portion 110.

The assembly is then placed in a vacuum furnace. As it is gradually heated, the vacuum furnace is evacuated to a relatively high vacuum to remove substantially all the oxygen. Before the melting point of the nickel brazing paste is reached, the furnace is partially backfilled with an inert gas such as argon or nitrogen. When the nickel melts, it flows by capillary action to integrally join the inner portion 98, the sleeve 106 and the end portion 110 together. The protruding end 118 of the end portion 110 and the flanged end 108 and flanged lip 112 are then machined off to form the finished valve member 10 with the spaced insulation chambers 96 extending around the central portion 54. As can be seen in this embodiment, the aligned insulation chambers 96 are substantially equally spaced between the cylindrical inner surface 92 which forms the cooling shaft 78 and the cylindrical outer surface 120.

In use, the system is assembled as shown and electrical power is applied to the heating elements 70, 72 to heat the nozzle 14 and manifold 18 to a predetermined operating temperature. Pressurized melt from a molding machine (not shown) is introduced into the melt passage 82 through the central inlet 84 according to a predetermined cycle. When injection pressure is applied, the force of the melt on the enlarged end 52 of the valve member overcomes the spring force and drives the valve member 10 forward until the split ring 90 stops against shoulder 122 in the open position. The melt then flows through the melt passage 82 and the gate 48 until the cavity 68 is filled. The combined force of the compression spring (not shown) and the melt pressure against the forward face 64 of the valve member 10 drives the valve member 10 to the retracted closed position in which the enlarged forward end 52 is seated in the matching mouth 50 of the gate 48. The injection pressure is then released and after a short cooling period, the mold is opened to eject the molded products. After ejection, the mold is closed and injection pressure is reapplied which reopens the gate 48. The cycle is repeated continuously with a frequency dependent upon the size of the cavity and the type of material being molded. As can be seen, the travel of the valve member 10 is relatively short, but large cavities can be filled quickly because of the large diameter of the enlarged forward end 52 of the valve member and the mouth 50 of the gate 48. The cooling water flowing around the spiral baffle 76 in the central cooling shaft 78 removes heat from the enlarged forward end 52 of the valve member so that the adjacent melt in the cavity 68 solidifies more quickly, thus decreasing cycle time. However, the provision of the insulation chamber 96 around the central cooling shaft 78 reduces lateral heat loss to the cooling water and substantially improves the problem of solidification of the melt in the forward portion 46 of the bore 12 around the cylindrical outer surface 120. This avoids cold flow imperfections in the molded products and allows faster colour changes.

While the description of the valve member 10 with insulation chamber 96 has been given with respect to a preferred embodiment, it is not to be construed in a limiting sense. Variations and modifications will occur to those skilled in the art. For instance, the numerous insulation chambers shown can be replaced by a few or even a single cylindrical insulation chamber. Alternatively, a spiral shaped insulation chamber can be provided by machining a spiral groove in the outer surface of the inner portion 98. It is also possible to make the insulation chambers by machining grooves in the inner surface 124 of the sleeve 106. Reference is made to the appended claims for a definition of the invention.

What is claimed is:

1. In an injection molding valve member having an elongated portion with a generally cylindrical outer surface and a generally cylindrical inner surface, the inner surface forming a cylindrical central cooling shaft which extends longitudinally through the elongated portion of the valve member, the improvement wherein the elongated portion of the valve member has at least one insulation chamber which extends concentrically around the central cooling shaft along a substantial portion of the length of the cooling shaft, the insulation chamber being spaced between the outer and inner cylindrical surfaces of the valve member.

2. A valve member as claimed in claim 1 wherein the elongated portion of the valve member has a plurality of insulation chambers which are longitudinally spaced in alignment around the central cooling shaft.

3. A valve member as claimed in claim 1 wherein the insulating chamber is spiral shaped and extends along the elongated portion of the valve member concentrically around the central cooling shaft.

4. A valve member as claimed in claim 2 wherein the cooling shaft has a dividing baffle extending longitudinally therein.

* * * * *